(12) United States Patent
Huang et al.

(10) Patent No.: US 8,673,175 B2
(45) Date of Patent: Mar. 18, 2014

(54) METHOD OF RECYCLING CHOLESTERIC LIQUID CRYSTAL

(75) Inventors: Pei-Chen Huang, Taipei (TW);
Chih-Lin Su, Hsinchu County (TW);
Kuo-Chang Wang, Taichung (TW);
Shih-Hsien Liu, Hsinchu County (TW);
Kung-Lung Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 76 days.

(21) Appl. No.: 13/523,711

(22) Filed: Jun. 14, 2012

(65) Prior Publication Data

US 2013/0146812 A1    Jun. 13, 2013

(30) Foreign Application Priority Data

Dec. 7, 2011   (TW) ............................. 100145024 A

(51) Int. Cl.
*C09K 19/02* (2006.01)
*C09K 19/52* (2006.01)
*C09K 19/54* (2006.01)

(52) U.S. Cl.
USPC ................................. 252/299.01; 252/299.5

(58) Field of Classification Search
USPC ......................................... 252/299.01, 299.5
See application file for complete search history.

(56) References Cited

U.S. PATENT DOCUMENTS

| 5,455,083 | A  | 10/1995 | Noh et al. |
| 7,241,502 | B2 | 7/2007 | Anselmann et al. |
| 2004/0091640 | A1 | 5/2004 | Moon et al. |
| 2006/0276691 | A1 | 12/2006 | Forkey et al. |
| 2009/0317792 | A1 | 12/2009 | Abbott et al. |
| 2010/0279125 | A1 | 11/2010 | Buyuktanir et al. |

FOREIGN PATENT DOCUMENTS

| CN | 1497036 | 5/2004 |
| JP | 57071603 | 5/1982 |
| JP | 2002166259 | 6/2002 |
| JP | 2004137467 | 5/2004 |
| JP | 2004275914 | 10/2004 |
| JP | 2006089519 | 4/2006 |
| JP | 2010214247 | 9/2010 |
| KR | 20020062870 | 7/2002 |
| KR | 20040027328 | 4/2004 |
| TW | I282359 | 6/2007 |

(Continued)

OTHER PUBLICATIONS

English translation by computer for JP 2002-166259, http://www4.ipdl.inpit.go.jp/Tokujitu/PAJdetail.ipdl?N0000=60&N0120=01&N2001=2&N3001=2002-166259.*

(Continued)

*Primary Examiner* — Shean C Wu

(57) ABSTRACT

A method of recycling a cholesteric liquid crystal is provided. The method includes providing a display medium material containing a micro-encapsulated cholesteric liquid crystal. The display medium material is mixed with a hydrophilic solvent to form a mixture having a temperature of between 70° C. and 100° C. Then, a hydrophobic solvent is added to mix with the hydrophilic solvent. The display medium material, the hydrophobic solvent and the hydrophilic solvent are mixed to form a mixture having a hydrophobic layer and a hydrophilic layer. The hydrophobic layer and the hydrophilic layer of the mixture are separated, wherein the hydrophobic layer contains a cholesteric liquid crystal and the hydrophobic solvent. Then, the hydrophobic solvent is removed from the hydrophobic layer to obtain the cholesteric liquid crystal.

9 Claims, 1 Drawing Sheet

(56) References Cited

FOREIGN PATENT DOCUMENTS

| TW | 200809298 | 7/2007 |
|---|---|---|
| TW | 201006541 | 2/2010 |
| TW | I327592 | 7/2010 |
| WO | WO 2008053966 | 5/2008 |

OTHER PUBLICATIONS

J. Koetz et al., "Recovery of Nanoparticles Produced in Phosphatidylcholing-Based Template Phases," Journal of Colloid and Interface Science, Apr. 2005, pp. 190-198, vol. 284, Elsevier, US.

V. Germain et al., "Silver Nanodisks: Size Selection via Centrifugation and Optical Properties," The Journal of Chemical Physics, Mar. 2005, pp. 124707-1-124707-8, vol. 122, American Institute of Physics, US.

Myakonkaya et al., "Recovery of Nanoparticles Made Easy," Langmuir Letter, Feb. 2010, pp. 3794-3797, vol. 26, American Chemical Society, US.

Cheng-Yi Wang et al.,"Large Scale Bistable Cholesteric Liquid Crystal Display with Thermal Addressing," IDW '10, 2010, pp. 1553-1556, ITE and SID, US.

\* cited by examiner

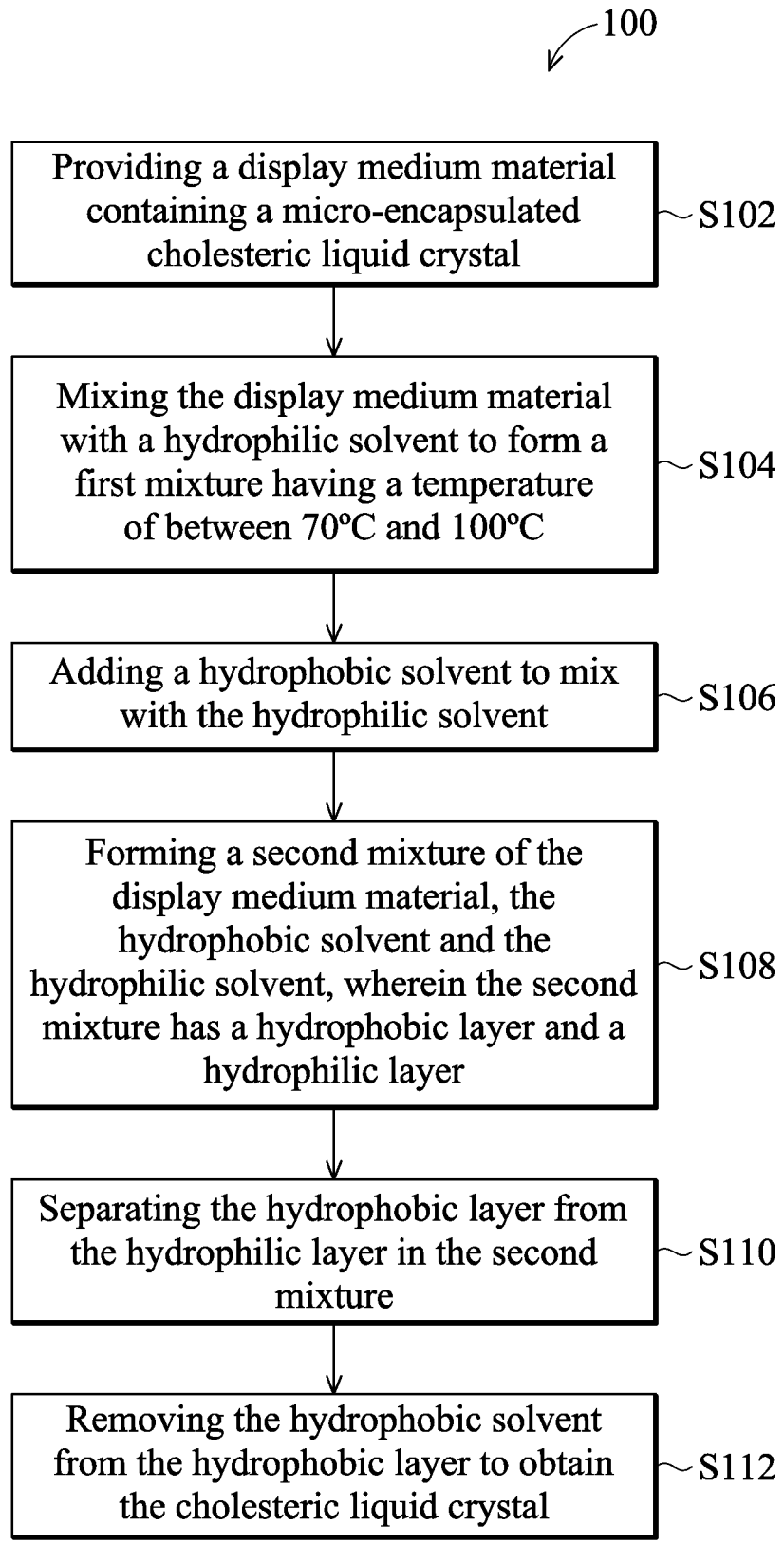

METHOD OF RECYCLING CHOLESTERIC LIQUID CRYSTAL

CROSS REFERENCE TO RELATED APPLICATIONS

This application claims priority of Taiwan Patent Application No. 100145024, filed on Dec. 7, 2011, the entirety of which is incorporated by reference herein.

BACKGROUND

1. Technical Field

The technical field relates to a method of recycling a liquid crystal material, and more specifically to a method of recycling a cholesteric liquid crystal in a micro-encapsulated cholesteric liquid crystal.

2. Description of the Related Art

Cholesteric liquid crystal displays have advantages of having bi-stable display characteristics, a large display area, being easy to manufacture and resistant to shock, such that cholesteric liquid crystal have become an important display medium material.

Currently, a fluxional cholesteric liquid crystal is confined in a specific space to form micro-encapsulated cholesteric liquid crystal by micro-encapsulating technology. Then, the micro-encapsulated cholesteric liquid crystal is dispersed in a dispersant and then coated on flexible display panels for flexible display application to satisfy the flexible requirements of the flexible displays.

The cost of cholesteric liquid crystal is expensive and cholesteric liquid crystal waste is not environmentally friendly. Thus, recycling of micro-encapsulated cholesteric liquid crystal has become an important research area as the amount of the micro-encapsulated cholesteric liquid crystal used in flexible displays greatly increases.

SUMMARY

One embodiment provides a method of recycling a cholesteric liquid crystal, comprising: providing a display medium material, containing a micro-encapsulated cholesteric liquid crystal; mixing the display medium material with a hydrophilic solvent to form a first mixture, wherein the first mixture has a temperature of between 70° C. and 100° C.; adding a hydrophobic solvent to mix with the hydrophilic solvent; forming a second mixture of the display medium material, the hydrophobic solvent and the hydrophilic solvent, wherein the second mixture has a hydrophobic layer and a hydrophilic layer; separating the hydrophobic layer from the hydrophilic layer in the second mixture, wherein the hydrophobic layer contains a cholesteric liquid crystal and the hydrophobic solvent; and removing the hydrophobic solvent from the hydrophobic layer to obtain the cholesteric liquid crystal.

One embodiment provides a method of reprocessing a cholesteric liquid crystal, comprising: providing a cholesteric liquid crystal obtained from the above mentioned method of recycling a cholesteric liquid crystal; and modulating a photoelectric property of the cholesteric liquid crystal.

A detailed description is given in the following embodiments with reference to the accompanying drawings.

BRIEF DESCRIPTION OF THE DRAWINGS

The disclosure can be more fully understood by reading the subsequent detailed description and examples with reference to the accompanying drawings, wherein:

FIG. 1 shows a flow chart of a method of recycling a cholesteric liquid crystal according to an embodiment of the invention.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment, a cholesteric liquid crystal in a micro-encapsulated cholesteric liquid crystal can be recycled. The micro-encapsulated cholesteric liquid crystal is formed by encapsulating a cholesteric liquid crystal in a shell. The shell may be made of SiO2 or polyurethane (PU).

When flexible display panel is discarded, the display medium layer in the flexible display panels can be taken out and the micro-encapsulated cholesteric liquid crystal in the display medium layer can be recycled according to the embodiments. The shell of the micro-encapsulated cholesteric liquid crystal is destroyed to recycle the cholesteric liquid crystal in the shell. The display medium layer comprises a display medium material and a binder. The material of the binder is for example polyurethane (PU). The display medium material includes the micro-encapsulated cholesteric liquid crystal dispersed in a dispersant. The material of the dispersant is for example gelatin or polyvinyl alcohol (PVA). The cholesteric liquid crystal encapsulated by $SiO_2$ is usually dispersed in gelatin. The cholesteric liquid crystal encapsulated by polyurethane (PU) is usually dispersed in polyvinyl alcohol (PVA) or gelatin.

Furthermore, a display medium material not coated on a flexible display panel yet can also be recycled according to the embodiments. The shell of the micro-encapsulated cholesteric liquid crystal in the display medium material is destroyed to recycle the cholesteric liquid crystal in the shell.

The above mentioned display medium materials to be recycled may be a deteriorated or a non-deteriorated material. The deteriorated display medium material is for example a moldy display medium material or the micro-encapsulated cholesteric liquid crystal is separated from the dispersant to produce a delaminated phenomenon in the display medium material.

Referring to FIG. 1, which shows a flow chart of a method 100 of recycling a cholesteric liquid crystal according to an embodiment. Firstly, at the step S102, a display medium material is provided. The display medium material includes a micro-encapsulated cholesteric liquid crystal. The display medium material is for example provided from a display medium layer in a flexible display panel. The display medium layer includes the display medium material consisting of the micro-encapsulated cholesteric liquid crystal and a dispersant, and further includes a binder. Note that the display medium material may be a deteriorated or a non-deteriorated display medium material which is not coated on a flexible display panel yet. The display medium material includes the micro-encapsulated cholesteric liquid crystal and the dispersant. Moreover, the display medium material may further include a surface active agent, dyes and other additives.

At the step S104, a hydrophilic solvent with a specific temperature is provided. The hydrophilic solvent is for example hot water having a temperature of between 70° C. and 100° C. The display medium material is mixed with the hydrophilic solvent of the specific temperature and stirred to form a mixture with a temperature of between 70° C. and 100° C. The shell of the micro-encapsulated cholesteric liquid crystal is dissolved in the hydrophilic solvent at the temperature of between 70° C. and 100° C. Moreover, the dispersant, mold, the surface active agent, dyes and other additives are also dispersed in the hydrophilic solvent. Furthermore, the binder of the display medium layer is also dispersed in the hydrophilic solvent. In one embodiment, a weight ratio of the hydrophilic solvent to the display medium material may be between about 100:1 and about 5:4 or between about 50:1 and about 5:1. The temperature of the hydrophilic solvent can be modified according to the weight ratio of the hydrophilic solvent to the display medium material to make the mixture of the display medium material and the hydrophilic solvent have a temperature of between 70° C. and 100° C.

At the step S106, a hydrophobic solvent is added to mix with the hydrophilic solvent. The hydrophobic solvent is for example hexane, ethyl acetate, heptane or tetrachloromethane. According to the embodiments, a weight ratio of the hydrophobic solvent to the hydrophilic solvent is between about 4:6 and about 1:9.

At the step S108, the display medium material, the hydrophobic solvent and the hydrophilic solvent are mixed to form a mixture. The mixture has a hydrophobic layer and a hydrophilic layer. The cholesteric liquid crystal is dissolved in the hydrophobic solvent to form the hydrophobic layer. The shell of the micro-encapsulated cholesteric liquid crystal, the dispersant, the binder, the mold, the surface active agent, the dyes and the other additives are dispersed in the hydrophilic solvent to form the hydrophilic layer.

At the step S110, the hydrophobic layer is separated from the hydrophilic layer in the mixture, wherein the hydrophobic layer contains the cholesteric liquid crystal and the hydrophobic solvent. After several times of the extraction process is performed, most of the cholesteric liquid crystal is separated from the other materials in the display medium material.

At the step S112, the hydrophobic solvent is removed from the hydrophobic layer to obtain the cholesteric liquid crystal. At this step, a drying agent, for example magnesium sulfate may be added in the hydrophobic layer and then through filtering, concentrating and sucking dry processes the hydrophobic solvent is removed.

Next, an adsorbent may be added in the recycled cholesteric liquid crystal. The material of the adsorbent is an inorganic salt, for example aluminum oxide, zeolite, silica gel or titanium oxide. The adsorbent can adsorb ionic impurities in the cholesteric liquid crystal to purify the recycled cholesteric liquid crystal.

According to the embodiment, the shell of the micro-encapsulated cholesteric liquid crystal is destroyed by the hydrophilic solvent at the temperature of between 70° C. and 100° C. and the cholesteric liquid crystal is dissolved in the hydrophobic solvent. Therefore, using the above mentioned temperature of between 70° C. and 100° C. and a co-solvent of the hydrophilic solvent and the hydrophobic solvent the cholesteric liquid crystal in the micro-encapsulated cholesteric liquid crystal can be recycled.

Then, physical properties of the recycled cholesteric liquid crystal, for example a reflective wavelength ($\lambda_{max}$) and a band width ($\Delta \lambda$) of the recycled cholesteric liquid crystal to an ultraviolet light are measured. Then, a photoelectric property of the recycled cholesteric liquid crystal can be modulated according to the measured physical properties and the application requirements for the recycled cholesteric liquid crystal. The methods for modulating the photoelectric property of the recycled cholesteric liquid crystal includes adding a chiral dopant in the recycled cholesteric liquid crystal, changing the kinds of the cholesteric liquid crystal monomers or changing the ratios of the cholesteric liquid crystal monomers in the cholesteric liquid crystal composition.

Next, the recycled cholesteric liquid crystal can be further encapsulated to form a new micro-encapsulated cholesteric liquid crystal. Then, the new micro-encapsulated cholesteric liquid crystal can be mixed with a new and appropriate dispersant to form a new display medium material. The new dispersant may be the same as or different from the original dispersant used in the original and un-recycled display medium material. The mixing ratio of the micro-encapsulated and recycled cholesteric liquid crystal to the new dispersant may be the same as or different from the mixing ratio of the original micro-encapsulated cholesteric liquid crystal to the original dispersant in the original and un-recycled display medium material. Therefore, the new display medium material may have the photoelectric properties the same as or different from that of the original and un-recycled display medium material.

EXAMPLE 1

Recycling a Cholesteric Liquid Crystal from a Flexible Display Panel

Firstly, 100 g of water was heated to 80° C. to form hot water. Then, 3 g of a flexible display panel (5×5 cm²) and added into the hot water to scrape a display medium layer on the pieces of the flexible display panel into the hot water. The materials of the display medium layer include a micro-encapsulated cholesteric liquid crystal (the material of a shell of the micro-encapsulated cholesteric liquid crystal was PU. The composition and the ratio of the cholesteric liquid crystal monomers are shown in Table 1), a binder of PU and a dispersant of gelatin. After a mixture of the above mentioned materials was stirred for one hour, the shell of the micro-encapsulated cholesteric liquid crystal was destroyed by the hot water to release a cholesteric liquid crystal. The cholesteric liquid crystal, the dispersant of gelatin, the binder and the hot water were mixed together to form a turbid solution.

TABLE 1

The composition and the ratio of the cholesteric liquid crystal monomers

| cholesteric liquid crystal monomers | Percentage (wt %) |
|---|---|
| $C_5H_{11}$—⟨cyclohexyl⟩—⟨phenyl⟩—⟨phenyl⟩—CN | 10% |

TABLE 1-continued

The composition and the ratio of the cholesteric liquid crystal monomers

| cholesteric liquid crystal monomers | Percentage (wt %) |
|---|---|
| $C_3H_7$—⬡—⬢—$OC_2H_5$ | 5% |
| $C_2H_5$—⬢—⬢—CN | 15% |
| $C_5H_{11}$—⬢—⬢—CN | 30% |
| $C_3H_7$—⬡—COO—⬢—⬢—CN | 10% |
| $C_7H_{15}$—⬢—⬢—CN | 6% |
| $C_5H_{11}$—⬢—COO—⬢—⬢—CN | 24% |
| Total | 100% |

Next, 50 g of a hydrophobic solvent of hexane was added into the turbid solution and hexane was mixed with water. The materials of the display medium layer, hexane and water were mixed together to form a mixture. The mixture had a hydrophobic layer (organic layer) and a hydrophilic layer (water layer), wherein the cholesteric liquid crystal was dissolved in hexane to form the organic layer and the shell of the micro-encapsulated cholesteric liquid crystal, gelatin and the binder were dispersed in the water to form the water layer.

The organic layer was separated from the water layer. The organic layer containing the cholesteric liquid crystal and hexane was taken out and then a drying agent of magnesium sulfate was added in the organic layer. After filtering, concentrating and sucking dry processes, hexane was removed to obtain a recycled cholesteric liquid crystal.

Then, an adsorbent of silicon dioxide was added in the recycled cholesteric liquid crystal to purify the recycled cholesteric liquid crystal. After a filtering step, the purified cholesteric liquid crystal was obtained.

In the embodiment, a recycling percentage of the cholesteric liquid crystal recycled from the flexible display panel was about 85 wt %. Through measuring the photoelectric properties of the recycled cholesteric liquid crystal of the embodiment, the measurement results showed a reflective wavelength ($\lambda_{max}$) of the recycled cholesteric liquid crystal to an ultraviolet light was 550 nm and a band width ($\Delta\lambda$) of the recycled cholesteric liquid crystal to an ultraviolet light was 74.9 nm. The recycled cholesteric liquid crystal was injected into a cell between two glass plates to form a device and then the photoelectric properties of the device were measured. The measurement results showed a reflectivity of the recycled cholesteric liquid crystal was 9.3% and a driving voltage of the recycled cholesteric liquid crystal was 27 volts.

EXAMPLE 2

Recycling a Cholesteric Liquid Crystal from a Display Medium Material

The method of the Example 2 was the same as that of the Example 1, except for the Example 2 not requiring the steps of cutting a flexible display panel into several pieces and taking out a display medium layer from the flexible display panel. A display medium material of the Example 2 containing a micro-encapsulated cholesteric liquid crystal (the material of a shell of the micro-encapsulated cholesteric liquid crystal was PU. The composition and the ratio of the cholesteric liquid crystal monomers are shown in Table 1) and a dispersant of gelatin was directly added into hot water of 80° C. and then a cholesteric liquid crystal was recycled by the same steps as that of the Example 1. In the Example 2, a recycling percentage of the cholesteric liquid crystal recycled from the display medium material was about 87 wt %. Through measuring the photoelectric properties of the recycled cholesteric liquid crystal of the Example 2, the measurement results showed a reflective wavelength ($\lambda_{max}$) of the recycled cholesteric liquid crystal to an ultraviolet light was 550 nm and a band width ($\Delta\lambda$) of the recycled cholesteric liquid crystal to an ultraviolet light was 75.1 nm. The recycled cholesteric liquid crystal was injected into a cell between two glass plates to form a device and then measuring the photoelectric properties of the device. The measurement results showed a reflectivity of the recycled cholesteric liquid crystal was 9.5% and a driving voltage of the recycled cholesteric liquid crystal was 27 volts.

EXAMPLE 3

Measuring Photoelectric Properties of a New Cholesteric Liquid Crystal

Through measuring the photoelectric properties of a new cholesteric liquid crystal material (the composition and the ratio of the cholesteric liquid crystal monomers are shown in Table 1), the measurement results showed a reflective wavelength ($\lambda_{max}$) of the new cholesteric liquid crystal material to an ultraviolet light was 550 nm and a band width ($\Delta\lambda$) of the new cholesteric liquid crystal material to an ultraviolet light was 75.8 nm. The new cholesteric liquid crystal material was injected into a cell between two glass plates to form a device and then measuring the photoelectric properties of the device. The measurement results show a reflectivity of the new cholesteric liquid crystal material was 9.5% and a driving voltage of the new cholesteric liquid crystal material was 27 volts.

As shown in the measurement results of Examples 1-3, the recycled cholesteric liquid crystal obtained from the flexible display panel and the display medium material according to the methods of the Examples 1-2 photoelectric properties which were similar to that of the new cholesteric liquid crystal material of the Example 3.

Therefore, according to the embodiments, both a display medium layer in a flexible display panel and a display medium material not coated on a flexible display panel yet can be recycled. The shell of a micro-encapsulated cholesteric liquid crystal is destroyed and a cholesteric liquid crystal in the micro-encapsulated cholesteric liquid crystal is recycled. Moreover, the photoelectric properties of the recycled cholesteric liquid crystal are similar to that of a new cholesteric liquid crystal material (with the same composition and ratio of the cholesteric liquid crystal monomers as the recycled cholesteric liquid crystal). Thus, the recycled cholesteric liquid crystal obtained according to the embodiments can be used in cholesteric liquid crystal displays.

In addition, a chiral dopant can be added into the recycled cholesteric liquid crystal to modulate the photoelectric properties of the recycled cholesteric liquid crystal. The recycled cholesteric liquid crystal can be encapsulated to form micro-encapsulated cholesteric liquid crystal and then mixed with a dispersant to form a new display medium material to apply in flexible display panels. Therefore, the embodiments can save the material cost of the cholesteric liquid crystal and also satisfy environmental requirements.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method of recycling a cholesteric liquid crystal, comprising:
    providing a display medium material, containing a micro-encapsulated cholesteric liquid crystal;
    mixing the display medium material with a hydrophilic solvent to form a first mixture, wherein the first mixture has a temperature of between 70° C. and 100° C.;
    adding a hydrophobic solvent to mix with the first mixture to form a second mixture, wherein the second mixture has a hydrophobic layer and a hydrophilic layer;
    separating the hydrophobic layer from the hydrophilic layer in the second mixture, wherein the hydrophobic layer contains a cholesteric liquid crystal and the hydrophobic solvent; and
    removing the hydrophobic solvent from the hydrophobic layer to obtain the cholesteric liquid crystal.

2. The method of recycling a cholesteric liquid crystal as claimed in claim 1, wherein the hydrophilic solvent comprises water.

3. The method of recycling a cholesteric liquid crystal as claimed in claim 1, wherein the hydrophobic solvent comprises hexane, ethyl acetate, heptane or tetrachloromethane.

4. The method of recycling a cholesteric liquid crystal as claimed in claim 1, wherein a weight ratio of the hydrophobic solvent to the hydrophilic solvent is between 4:6 and 1:9.

5. The method of recycling a cholesteric liquid crystal as claimed in claim 1, wherein a weight ratio of the hydrophilic solvent to the display medium material is between 100:1 and 5:4.

6. A method of reprocessing a cholesteric liquid crystal, comprising:
    providing a cholesteric liquid crystal obtained from the method of recycling a cholesteric liquid crystal as claimed in claim 1; and
    modulating a photoelectric property of the cholesteric liquid crystal.

7. The method of reprocessing a cholesteric liquid crystal as claimed in claim 6, wherein the step of modulating the photoelectric property of the cholesteric liquid crystal comprises adding a chiral dopant into the cholesteric liquid crystal.

8. The method of reprocessing a cholesteric liquid crystal as claimed in claim 6, further comprising performing a micro-encapsulating process to the cholesteric liquid crystal to form a reprocessed micro-encapsulated cholesteric liquid crystal.

9. The method of reprocessing a cholesteric liquid crystal as claimed in claim 8, further comprising mixing the reprocessed micro-encapsulated cholesteric liquid crystal with a dispersant to form a reprocessed display medium material.

* * * * *